United States Patent
Gage (10) Patent No.: US 9,967,903 B2
(45) Date of Patent: May 8, 2018

(54) SYSTEM AND METHOD FOR TRAFFIC CONTROL FOR MACHINE TYPE COMMUNICATIONS IN A WIRELESS COMMUNICATIONS SYSTEM

(71) Applicant: Huawei Technologies Co., Ltd., Shenzhen (CN)

(72) Inventor: William Anthony Gage, Stittsville (CA)

(73) Assignee: Huawei Technologies Co., LTD, Shenzhen (CN)

( * ) Notice: Subject to any disclaimer, the term of this patent is extended or adjusted under 35 U.S.C. 154(b) by 129 days.

(21) Appl. No.: 14/625,909

(22) Filed: Feb. 19, 2015

(65) Prior Publication Data
US 2016/0249385 A1 Aug. 25, 2016

(51) Int. Cl.
*H04W 4/00* (2009.01)
*H04W 74/08* (2009.01)
*H04W 74/00* (2009.01)
*H04W 74/06* (2009.01)

(52) U.S. Cl.
CPC ....... *H04W 74/0833* (2013.01); *H04W 4/005* (2013.01); *H04W 74/006* (2013.01); *H04W 74/06* (2013.01)

(58) Field of Classification Search
CPC H04W 74/0833; H04W 4/005; H04W 74/006
See application file for complete search history.

(56) References Cited

U.S. PATENT DOCUMENTS

| | | | |
|---|---|---|---|
| 2011/0171974 A1 | 7/2011 | Kim et al. | |
| 2012/0311147 A1* | 12/2012 | Keskitalo | H04W 24/10 709/224 |
| 2013/0102303 A1 | 4/2013 | Hapsari et al. | |
| 2013/0176923 A1 | 7/2013 | Liu et al. | |
| 2013/0178201 A1 | 7/2013 | Hapsari et al. | |
| 2013/0229931 A1* | 9/2013 | Kim | H04W 24/10 370/252 |
| 2013/0303129 A1* | 11/2013 | Yi | H04W 12/02 455/411 |

(Continued)

FOREIGN PATENT DOCUMENTS

| | | |
|---|---|---|
| CN | 102083003 A | 6/2011 |
| CN | 102740487 A | 10/2012 |
| CN | 102948196 A | 2/2013 |
| CN | 102972062 A | 3/2013 |
| WO | 2014051260 A1 | 4/2014 |
| WO | 2014071171 A2 | 5/2014 |
| WO | 2014153721 A1 | 10/2014 |

OTHER PUBLICATIONS

"3rd Generation Partnership Project; Technical Specification Group Radio Access Network; Evolved Universal Terrestrial Radio Access (E-UTRA); Physical channels and modulation (Release 12)," 3GPP TS 36.211 V12.4.0, Technical Specification, Dec. 2014, 124 pages.

(Continued)

*Primary Examiner* — Clemence Han
(74) *Attorney, Agent, or Firm* — Slater Matsil, LLP (57) ABSTRACT

A method for operating a wireless device configured for wireless communications includes receiving a reporting request including a reporting condition that information stored at the device is required to satisfy in order for the device to transmit the information, and initiating an uplink transmission procedure to transmit the information when the reporting condition is satisfied.

51 Claims, 9 Drawing Sheets

(56) References Cited

U.S. PATENT DOCUMENTS

| | | | | |
|---|---|---|---|---|
| 2014/0004849 A1* | 1/2014 | Su | ................... | H04W 24/08 |
| | | | | 455/423 |
| 2014/0274169 A1* | 9/2014 | Ta | ................... | H04W 12/02 |
| | | | | 455/458 |
| 2014/0314046 A1* | 10/2014 | Jung | ................ | H04W 36/165 |
| | | | | 370/331 |
| 2015/0036598 A1* | 2/2015 | Kilpatrick, II | ........ | H04W 64/00 |
| | | | | 370/329 |
| 2015/0045036 A1* | 2/2015 | Matin | ............ | H04W 36/0088 |
| | | | | 455/437 |
| 2015/0249900 A1 | 9/2015 | Kim et al. | | |
| 2016/0014037 A1 | 1/2016 | Hu et al. | | |
| 2016/0227383 A1* | 8/2016 | Lin | ................... | H04W 4/08 |
| 2016/0242059 A1* | 8/2016 | Lopes | ............... | H04W 24/02 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321 V12.4.0, Technical Specification, Dec. 2014, 60 pages.

"3rd Generaton Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.4.1, Technical Specification, Dec. 2014, 410 pages.

\* cited by examiner

SYSTEM AND METHOD FOR TRAFFIC CONTROL FOR MACHINE TYPE COMMUNICATIONS IN A WIRELESS COMMUNICATIONS SYSTEM

TECHNICAL FIELD

The present disclosure relates generally to digital communications, and more particularly to a system and method for traffic control for machine type communications (MTC) in a wireless communications system.

BACKGROUND

Machine type communications (MTC), also commonly referred to as machine-to-machine (M2M) communications, is a communication between two or more entities that does not necessarily need any direct human intervention. MTC typically involves a device (such as a sensor or meter) that captures an event or detects a condition within its local environment which is then communicated through a communications system to an application that translates the captured event or condition into meaningful information or actions. Systems that utilize MTC may be able to provide new services, improve existing processes, and the like.

Therefore, devices using MTC are expected to be a major source of traffic and revenue in future communications systems, such as the Third Generation Partnership Project (3GPP) Long Term Evolution-Advanced (LTE-A) and fifth generation (5G) communications systems. It is expected that in the year 2020, approximate device population will be on the order of about 100 times that of current 3GPP LTE communications systems, with about 1000 active devices per cell, about 10,000 total devices (active and inactive) per cell, and about 100,000 devices per square kilometer.

If transmissions from the MTC devices are not constrained, the combined traffic can overwhelm the radio interface and possibly the network infrastructure, potentially leading to congestion collapse. Hence, there is a need for a system and method for controlling transmissions (traffic) in such communications systems.

SUMMARY OF THE DISCLOSURE

Example embodiments of the present disclosure which provide a system and method for traffic control for machine type communications (MTC) in a wireless communications system.

In accordance with an example embodiment of the present disclosure, a method for operating a wireless device configured for wireless communications is provided. The method includes receiving, by the wireless device, a reporting request including a reporting condition that information stored at the device is required to satisfy in order for the device to transmit the information. The method also includes initiating, by the wireless device, an uplink transmission procedure to transmit the information when the reporting condition is satisfied.

In accordance with another example embodiment of the present disclosure, a method for operating a base station is provided. The method includes generating, by the base station, a reporting request including a first reporting condition that is configured to prompt a device to transmit information stored at the device to the base station when the information satisfies the first reporting condition, and transmitting, by the base station, the reporting request to the device. The method also includes receiving, by the base station, the information from the device in accordance with the reporting request.

In accordance with another example embodiment of the present disclosure, a wireless device is provided. The wireless device includes a receiver, and a processor operatively coupled to the receiver. The receiver receives a reporting request from a base station, the reporting request includes a reporting condition that information stored at the device is required to satisfy in order for the device to transmit the information. The processor initiates an uplink transmission procedure to transmit the information when the reporting condition is satisfied.

In accordance with another example embodiment of the present disclosure, a base station is provided. The base station includes a processor, a transmitter operatively coupled to the processor, and a receiver operatively coupled to the processor. The processor generates a reporting request including a first reporting condition that is configured to prompt a device to transmit information stored at the device to the base station when the information satisfies the first reporting condition. The transmitter transmits the reporting request to the device. The receiver receives the information from the device in accordance with the reporting request One advantage of an embodiment is that reporting machine type communications devices (MTCDs) can be limited to those MTCDs that have information of interest.

Another advantage is that information may be prioritized and higher priority information may be allowed a different successful transmission probability than lower priority information.

A further advantage of an embodiment is that devices may be sampled and the information may be prioritized according to results of the sampling.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to traffic control for MTC. For example, a wireless device receives a reporting request including a reporting condition that information stored at the device is required to satisfy in order for the device to transmit the information, and initiates an uplink transmission procedure to transmit the information when the reporting condition is satisfied.

The present disclosure will be described with respect to example embodiments in a specific context, namely communications systems that support MTC and use information stored at devices to perform traffic control. The disclosure may be applied to standards compliant communications systems, such as those that are compliant with Third Generation Partnership Project (3GPP), IEEE 802.11, and the like, technical standards, and non-standards compliant communications systems, that support MTC and use information stored at devices to perform traffic control. The disclosure may also be applied to non-MTC systems and use information stored at devices to perform traffic control.

Figure 1:
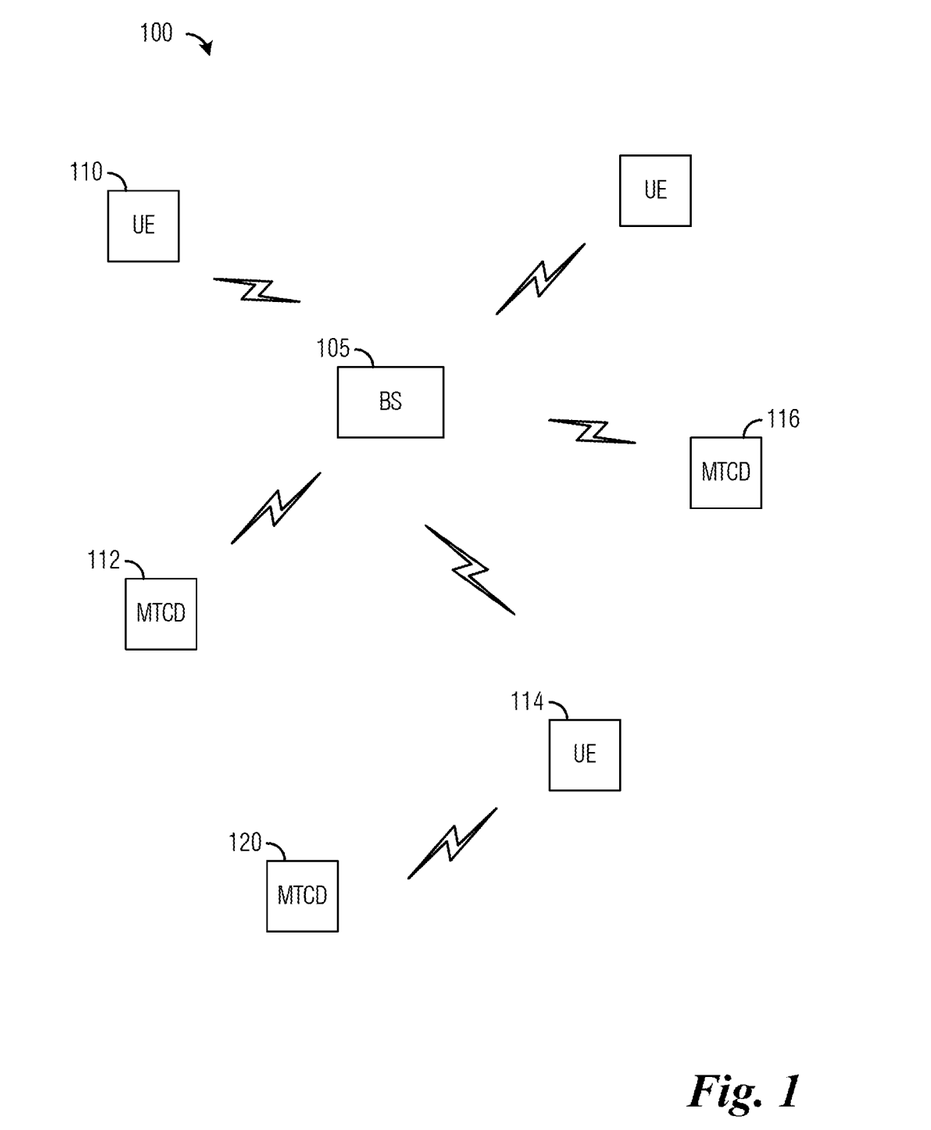
FIG. 1 illustrates an example communications system according to example embodiments described herein.

FIG. 1 illustrates an example communications system 100. Communications system 100 includes a Base Station (BS) 105 serving a plurality of devices, such as user equipments (UEs), including UE 110 and UE 114, and MTC devices (MTCDs), including MTCD 112, MTCD 116, and MTCD 120. In general, a UE may be used to refer to a device that support human-type communications (HTC), such as voice, multimedia, web browsing, and the like, and a MTCD may be used to refer to a devices that provide only MTC functionality without any HTC functionality, as well as devices that provide both HTC and MTC functionality. BS 105 is serving the plurality of devices (UEs and/or MTCDs) by receiving transmissions from devices (such as UEs and/or MTCDs) and then forwarding the transmissions to its intended destinations. In such a communications mode, BS 105 and the plurality of UEs and MTCDs are said to be operating in a cellular or infrastructure mode. Base Stations may also be commonly referred to as NodeBs, evolved NodeBs (eNBs), access points, controllers, communications controllers, interworking functions, and the like, while UEs may also be commonly referred to as wireless devices, mobile devices, mobiles, mobile stations, terminals, users, subscribers, stations, smartphones, and the like. MTCDs may also be commonly referred to as sensors, actuators, machines, monitors, transponders, gauges, and the like.

While it is understood that communications systems may employ multiple BSs capable of communicating with any number of devices (e.g., UEs and/or MTCDs), only one BS, and a number of devices are illustrated for simplicity.

An example application of MTC involves sensors (an example of a MTCD) that periodically report their sensor readings. Examples of sensors include weather sensors, temperature sensors, security sensors, fire sensors, health sensors, structural sensors, vehicular sensors, and the like. In general, a sensor will transmit its sensor reading and only occasionally will receive a transmission. Additionally, the sensor typically transmits only occasionally, for example, once every few seconds, minutes, hours, or days. Furthermore, the sensor readings are generally small, on the order of a few bytes (e.g., packets on the order of 10 to 100 bytes). Therefore, machine-type communications may be characterized as uplink dominated traffic with very short packets and very long inter-packet arrival times.

Although the discussion of the example embodiments discussed herein focuses on sensors and their related transmissions, the example embodiments presented herein are operable with other forms of MTC traffic, as well as non-MTC traffic where traffic control is performed in accordance with the content of the information being stored at the devices. Therefore, the discussion presented herein should not be construed as being limiting to either the scope or the spirit of the example embodiments.

Figure 2:
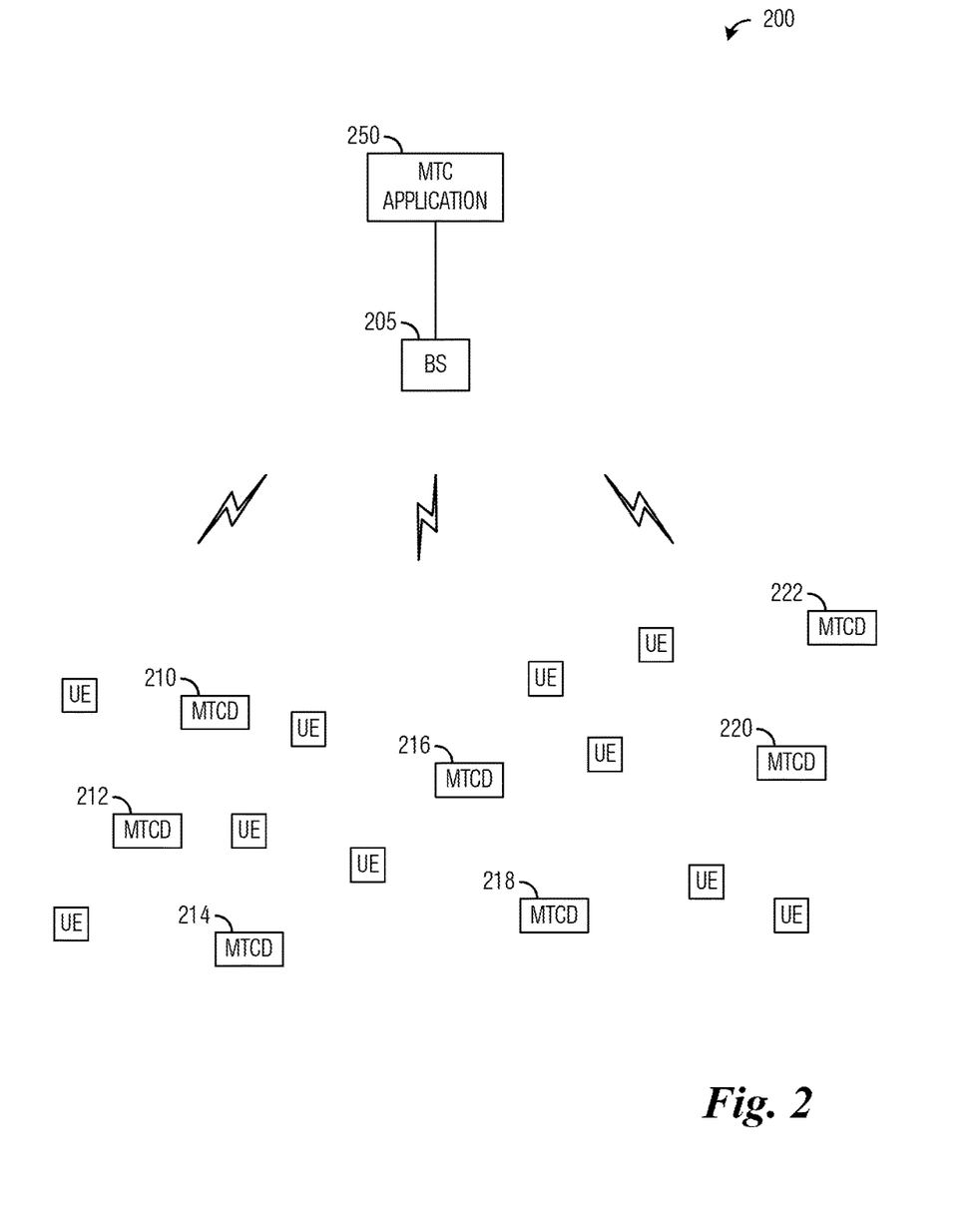
FIG. 2 illustrates an example communications system highlighting MTC operation according to example embodiments described herein.

FIG. 2 illustrates an example communications system 200 highlighting MTC operation. Communications system 200 includes a BS 205 serving a plurality of devices. Some of the devices may be operating in the MTC mode, such as MTCDs 210-222. Some of the devices operating in the MTC mode may be MTC only devices, while others may be UEs that incorporate MTCD functionality. An MTC Application 250 may provide BS 205 with instructions for communicating with one or more of the MTCDs 210-222. Reports received from one or more of the MTCDs 210-222 are may be relayed by BS 205 to MTC Application 250.

As discussed previously, MTCDs may periodically transmit small amounts of information, such as sensor data, to BS 205. BS 205 may process and/or aggregate the information from the MTCDs and forward the processed information to a MTC application, such as MTC Application 250. However, due to the long intervals between transmissions, the MTCDs may enter a low power (or idle and/or sleep) state and may need to obtain uplink resources prior to transmitting their information. If the transmissions from the MTCDs are not constrained, the combined traffic from the large number of MTCDs can overwhelm the radio interface (and possibly the network infrastructure), leading to congestion and potential collapse. Furthermore, due to short packet sizes, there may be a disproportionately high level of control overhead associated with the transmissions of the information from the MTCDs. This may be further exacerbated if the information indicates nothing is abnormal and BS 205 or MTC Application 250 discards the information.

According to an example embodiment, a MTCD determines if it is to transmit its information in accordance with the content of the information that it has stored and a reporting request received from its serving BS. In general, the reporting request may be a message received from an entity, such as a BS, a MTC Application, and the like, that includes criterion or criteria that are used for content-based traffic control. In some example embodiments, the reporting request may include a paging record. Typically, the paging record includes at least one reporting condition, which must be met by the content of the information stored at the MTCD in order for the MTCD to report the information. The MTCD compares its information with a reporting condition of the paging record and if the information (the content of the information) meets the reporting condition, the MTCD may transmit the information. According to an example embodiment, the reporting condition may be expressed as a threshold value or as the current state detected by the MTCD. According to another example embodiment, the reporting condition may be expressed as a change (a delta) or a rate of change with respect to a previous report(s). The use of a change or a rate of change may enable the identification of MTCDs that are sensing rapidly changing conditions. According to an alternate example embodiment, the reporting condition(s) may be signaled to the MTCD prior to paging using higher layer signaling, such as radio resource control (RRC) signaling. Subsequent reporting condition(s) included in a paging record(s) may take precedence over reporting conditions received using higher layer signaling.

As an illustrative example, the reporting condition of the paging record may specify that if temperature information recorded by a MTCD is greater or less than a temperature threshold, the MTCD may transmit the information. As another illustrative example, the reporting condition of the paging record may specify if door sensor switch state information recorded by a MTCD indicates that the door is in an opened or unlocked state, the MTCD may transmit the information. As yet another illustrative example, the reporting condition of the paging record may specify if heart sensor information recording by a MTCD indicates that the heart rate is greater or less than a heart rate threshold, the MTCD may transmit the information. As yet another illustrative example, the reporting condition of the paging record may specify if water sensor information recorded by a MTCD indicates that there is water on the floor, the MTCD may transmit the information. As a further illustrative example, the reporting condition of the paging record may specify if carbon monoxide sensor information recorded by a MTCD indicates that there is no carbon monoxide present, the MTCD may not transmit the information.

The paging record may also include other conditions, such as a paging group condition, which may specify a paging group identifier to which a MTCD must belong in order for the MTCD to transmit its information (assuming that the information meets the reporting condition). The paging record may also include a selection condition, which may specify an attribute(s) of the MTCD, such as the location of the device, the time interval since the last report, the type of device, or the identity of the business entity or application that owns the device, and the like. The MTCD attributes must include an attribute meeting the selection condition in order for the MTCD to transmit its information (assuming that the MTCD meets any other condition of the paging record).

Figure 3A:
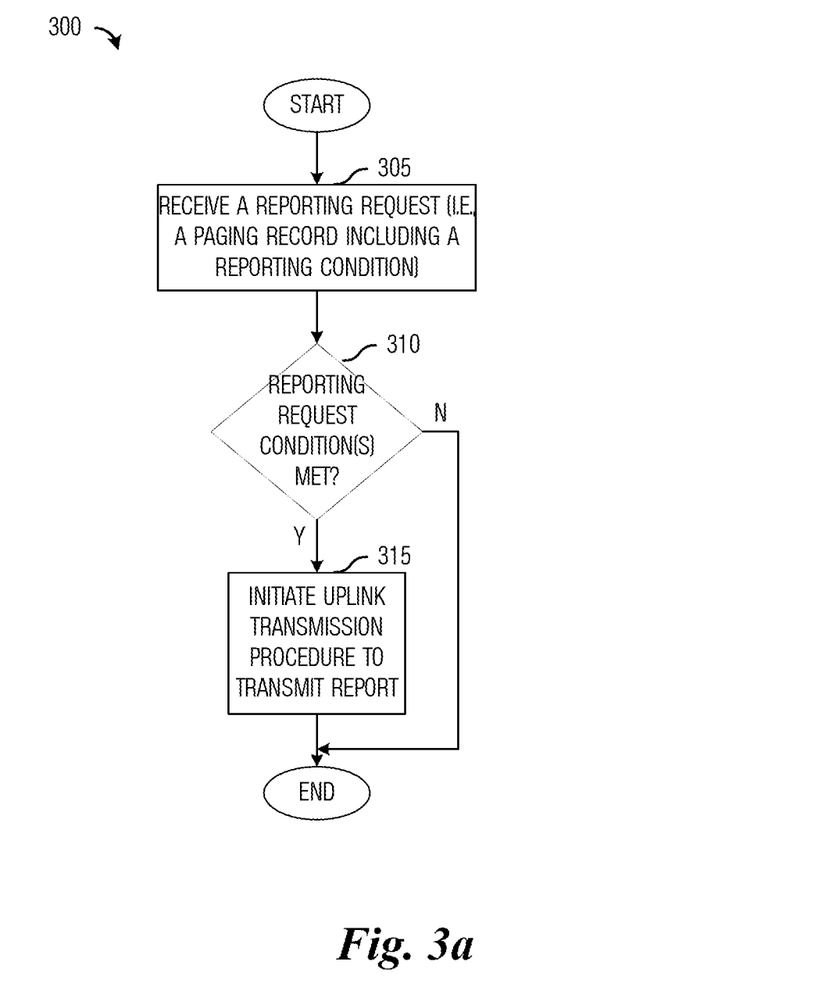
FIG. 3a illustrates a flow diagram of example operations occurring in a MTCD as the MTCD transmits a report while utilizing content-based traffic control according to example embodiments described herein.

FIG. 3a illustrates a flow diagram of example operations 300 occurring in a MTCD as the MTCD transmits a report while utilizing content-based traffic control. Operations 300 may be indicative of operations occurring in a MTCD, such as MTCDs 210-222, as the MTCD transmits a report while utilizing content-based traffic control.

Operations 300 may begin with the MTCD receiving a reporting request comprising a paging record(s) including a reporting condition(s) (block 305). In addition to the reporting condition, the paging record(s) may also include a paging group condition and/or a selection condition. According to an example embodiment, in a 3GPP Long Term Evolution (LTE) system the paging record may be found in a physical downlink shared channel (PDSCH). As an illustrative example, the MTCD may search in a physical downlink control channel (PDCCH) for a downlink control information (DCI) block that is configured with a content-based MTC paging radio network temporary identifier (RNTI), MC-RNTI. The MC-RNTI may be a reserved RNTI value similar in purpose to a paging RNTI (P-RNTI). The MC-RNTI may indicate a region in the PDSCH that contains one or more paging records.

As an illustrative example, each of the paging records may include a reporting condition and potentially one or more of a group condition (e.g., a MTC paging group identifier), a selection condition, an uplink channel identifier, and the like. As discussed previously, the reporting condition may specify one or more values or ranges that information stored at the MTCD meets in order to transmit a report. The group condition may specify a MTC group that is associated with the paging record. In other words, the paging record applies to MTCDs belonging to the MTC group as identified in the group condition. The selection condition may specify one or more attributes that the MTCD meets in order to transmit a report. Examples of the selection condition may include geo-location information, MTCD type, MTCD priority, information type, information priority, and the like. The uplink channel identifier in the paging record may specify an uplink channel to use for a report that matches the reporting and selection criteria. In an example embodiment, the uplink channel identifier may identify a dedicated physical random access channel (PRACH) or a PRACH partition of one or more PRACH resources assigned to MTCDs. In another embodiment, the uplink channel identifier may identify a contention-based channel that the MTCDs can use to transmit their report(s). In other words, the uplink channel identifier identifies one or more resources that can be used by the MTCD(s) that satisfy the condition(s) of the paging record to transmit or attempt to transmit their reports. The radio resources comprising the uplink channel may be indicated in the reporting request or may be indicated separately in a Radio Resource Control (RRC) message or may be broadcast by the BS (in a System Information Block (SIB), for example).

The MTCD may perform a check to determine if the condition(s) of the reporting request (e.g., the paging record) is satisfied or met (block 310). As an illustrative example, if the paging record includes a reporting condition, the MTCD may check to determine if its information satisfies the reporting condition. As another illustrative example, if the reporting condition of the paging record includes a group condition and a reporting condition, the MTCD may check to determine it belongs to a group identified in the group condition and if its information satisfies the reporting condition. As yet another illustrative example, if the reporting condition of the paging record includes a group condition, a reporting condition, and a selection condition, the MTCD may check to determine it belongs to a group identified in the group condition, if its information satisfies the reporting condition, and if its attributes satisfy the selection condition.

If the condition(s) of the reporting request (e.g., the paging record) is met, the MTCD may initiate an uplink transmission procedure in accordance with the uplink channel identifier to transmit its report (block 315). As an illustrative example, a PRACH partition identifier may identify a PRACH partition (of one or more PRACH resources, for example) wherein the MTCD may initiate a random access procedure to transmit its report. As another illustrative example, a contention-based channel identifier may identify a contention-based uplink channel wherein the MTCD may initiate a contention-based transmission procedure to transmit its report. It is noted that the MTCD may not be able to complete the transmission of its report even if it initiates the random access procedure or contention-based transmission procedure. In such a situation, the MTCD may be configured to retry at a subsequent time. Alternatively, the MTCD may abort its attempt to transmit its report and wait for another opportunity associated with a later paging record. If the condition(s) of the reporting request (e.g., paging record) is not met, operations 300 may end.

The reporting request may include an uplink transmission schedule. An uplink transmission schedule may be used to implement periodic reporting. According to an example embodiment, periodic reporting is implemented using content-based traffic control. Periodic reporting may involve the use of a report time condition that is met before the MTCD determines if it meets the condition(s) in the paging records. The report time condition may be provided to the MTCD in an uplink transmission schedule and/or a paging record.

Figure 3B:
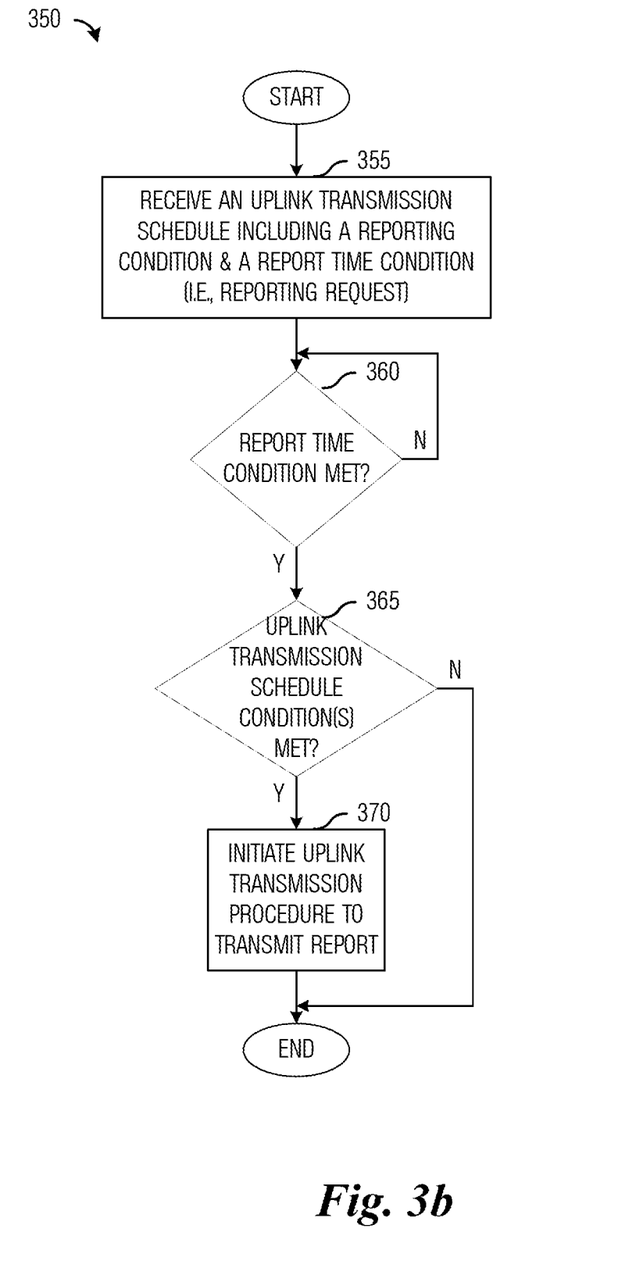
FIG. 3b illustrates a flow diagram of example operations occurring in a MTCD as the MTCD participates in periodic reporting according to example embodiments described herein.

FIG. 3b illustrates a flow diagram of example operations 350 occurring in a MTCD as the MTCD participates in periodic reporting. Operations 350 may be indicative of operations occurring in a MTCD, such as MTCDs 210-222, as the MTCD participates in periodic reporting.

Operations 350 may begin with the receiving a reporting request comprising an uplink transmission schedule(s) including a reporting condition(s) and a report time condition(s) (block 355). The uplink transmission schedule(s) may include the reporting condition(s) and the report time condition(s). Alternatively, the report time condition(s) may be signaled to the MTCD separate from the reporting condition(s). The report time condition(s) may be signaled to the MTCD using higher layer signaling, such as radio resource control (RRC) signaling. Similarly, the reporting condition(s) may be signaled to the MTCD using higher layer signaling, such as RRC signaling. The report time condition may be in the form of a time interval between reports, a timer value, specific report times, and the like. When the report time condition is met, e.g., at a time as specified by the time interval (for example, at an expiration of a timer set to the time interval) (block 360), the MTCD attempts to determine if it meets the conditions in the uplink transmission schedule(s) (block 365). If the MTCD meets the reporting condition(s) of the uplink transmission schedule(s), the MTCD initiates an uplink transmission procedure to transmit a report (block 370), while if the MTCD does not meet the reporting condition(s), the MTCD refrains from transmitting and operations 350 may end. According to an alternate example embodiment, the report time condition(s) may be signaled to the MTCD using higher layer signaling, such as RRC signaling, and the reporting condition(s) may be signaled to the MTCD in a paging record. If the MTCD meets the conditions of the paging record(s), the MTCD initiates an uplink transmission procedure according to the report time conditions indicated using higher layer signaling.

According to an example embodiment, a BS provides a paging record including a reporting condition, as well as potentially one or more of a group condition, a selection condition, an uplink channel identifier, and the like, that if met by information stored at a MTCD would allow the MTCD to transmit the information or attempt to transmit the information. According to an example embodiment, a MTC Application provides instructions to a BS including a reporting condition, as well as potentially one or more of a group condition, a selection condition, and a sampling indication.

According to an example embodiment, a MTC Application samples MTCDs using paging records to determine a distribution of information stored at the MTCDs. The MTC Application may provide the BS with a variety of reporting criteria. The BS incorporates the reporting criteria into paging records transmitted to the MTCDs and receives transmitted reports (if any) from the MTCDs which the BS relays to the MTC Application. Received reports corresponding to paging records indicate that there are MTCDs with information that satisfy the condition(s) of the paging records, while paging records that resulted in no received reports indicate that there are no MTCDs that satisfy such condition(s). While sampling, the MTC Application may not be interested in actually receiving the information in the reports. Therefore, the BS may not need to allocate a large number of uplink resources typically needed to support the reporting of the information. For example, a single PRACH resource may be sufficient for each paging record in order for the BS to detect that at least one MTCD has information meeting the condition(s) of the paging record. The MTC Application may then instruct the BS to configure paging records with sufficient uplink resources to actually receive the information satisfying the paging records used in sampling.

Figure 4A:
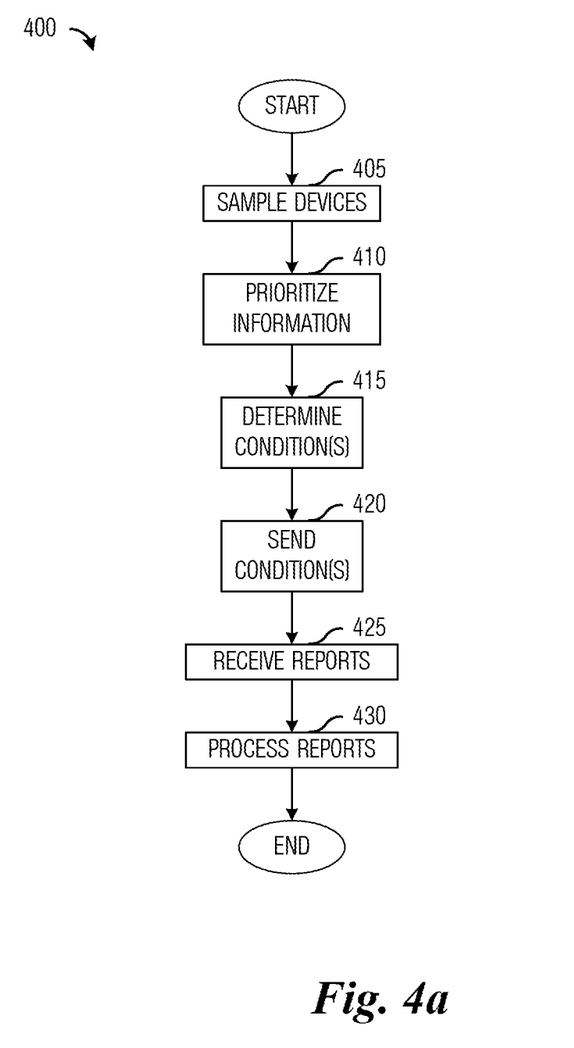
FIG. 4a illustrates a flow diagram of example operations occurring in a MTC Application using content-based traffic control according to example embodiments described herein.

FIG. 4a illustrates a flow diagram of example operations 400 occurring in a MTC Application using content-based traffic control. Operations 400 may be indicative of operations occurring in a MTC Application, such as MTC Application 250, as the MTC Application uses content-based traffic control.

Operations 400 may begin with the MTC Application sampling MTCDs (block 405). Sampling may be a technique used by an MTC Application to obtain a distribution of information stored at the MTCDs, as well as a distribution of the MTCDs themselves. According to an example embodiment, the MTC Application instructs a BS to transmit a plurality of paging records with each paging record including a condition(s) in which the MTC Application is interested. As an illustrative example, a paging record may include a condition specifying that only MTCDs of type "security sensor" with door sensor information equal to "open" report. The MTC Application may receive anywhere from 0 to a plurality of reports from the BS in accordance with responses to the paging records, e.g., if none of the paging conditions are met, then the MTC application will not receive any reports. Alternatively, the MTC Application may receive a summary of the received reports from the BS. As an illustrative example, the summary of the received reports may include indicators of which paging report(s) received a report. A detailed description of an example sampling process at the MTC Application is provided below. The MTC Application may prioritize the information stored at the MTCDs based on the received reports, as well as other information (block 410). Examples of the other information that the MTC Application may utilize to prioritize the information stored at the MTCDs may include MTCD priority information, MTCD type information, MTCD group information, MTCD geo-location information, MTCD attribute information, time-date information, information type, information priority, and the like.

The MTC Application may determine the condition(s) for polling the MTCDs in accordance with the prioritized information (block 415). Since the MTC Application knows the distribution of the information stored at the MTCDs, the MTC Application will typically not utilize a condition(s) that does not correspond to one or more reports. The MTC Application may also define the treatment (e.g., processing) to be afforded to the reports. As an illustrative example, the MTC Application may specify a traffic class (or quality of service (QoS) code point), a forwarding equivalence class, and the like to be used by the BS when allocating uplink channel resources and/or when forwarding reports to the MTC Application.

The MTC Application may provide the condition(s) for polling to the BS (block 420). The BS may use the condition(s) to generate paging record(s). The MTC Application may receive reports responsive to the paging record(s) (block 425). The MTC Application may receive reports forwarded by the BS. The reports may be from MTCDs that meet the condition(s) of the paging record(s). Alternatively, the MTC Application may receive the information contained in the reports or a summary of the information contained in the reports. The reports may be received at the BS as a result of the random access procedures using the PRACH partitions or as a result of contention-based transmissions occurring in the uplink contention-based channels identified in the paging records transmitted by the BS. The MTC Application may process the information included in the received reports (block 430).

Figure 4B:
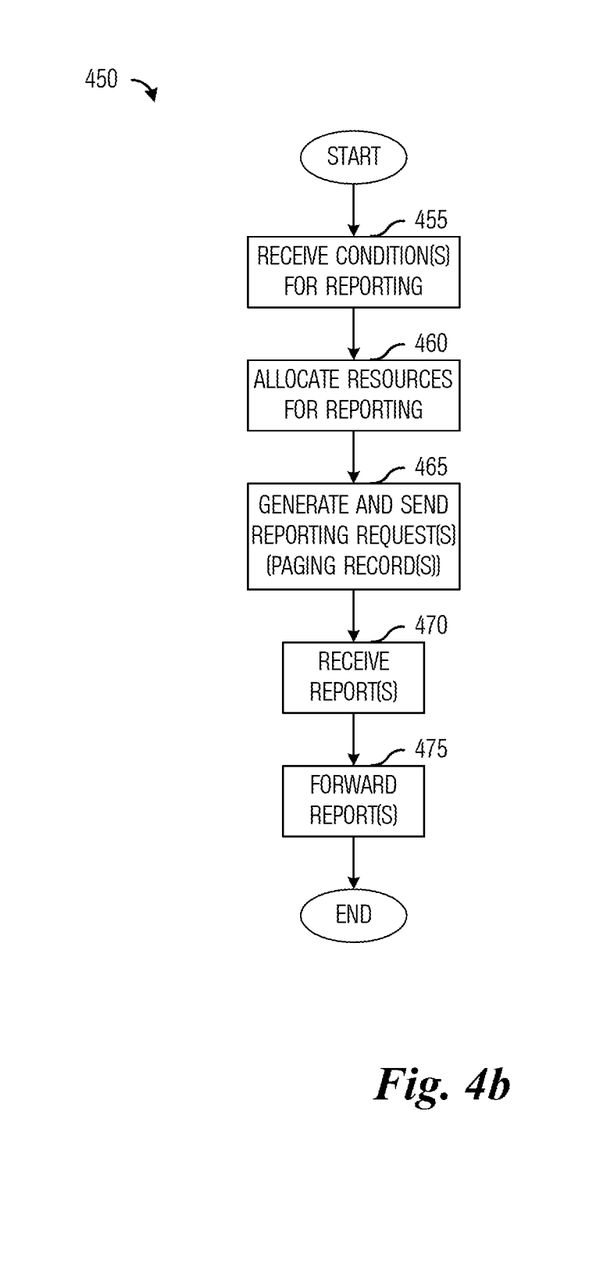
FIG. 4b illustrates a flow diagram of example operations occurring in a BS participating in content-based traffic control according to example embodiments described herein.

FIG. 4b illustrates a flow diagram of example operations 450 occurring in a BS participating in content-based traffic control. Operations 450 may be indicative of operations occurring in a BS, such as BS 205, as the BS participates in content-based traffic control.

Operations 450 may begin with the BS receiving condition(s) for reporting (block 455). The BS may also receive treatment(s) for the reports received due to the condition(s). The BS may allocate resources for reporting purposes, e.g., PRACH partitions or contention-based channels for receiving reports from MTCDs (block 460). The BS may allocate a number of resources commensurate with an expected number of MTCDs sending reports, the prioritized information, and the like. As an illustrative example, the BS may allocate a relatively large PRACH partition to reduce the probability of collision for information with a high priority and with an expected large number of reports, while low priority information with an expected small number of reports may be allocated a relatively small PRACH partition. The BS (as well as the MTC Application) may also consider historical information in the determination of the number of resources. As an illustrative example, the BS may assign a relatively small PRACH partition for information that has had a history of small number of reports even if it has a high priority. As yet another illustrative example, the BS may allocate PRACH resources on demand, such as in sequential random access.

The BS may generate and send reporting requests (e.g., paging records), including the condition(s) (block 465). According to an example embodiment, the syntax of the condition(s) is based on a class or type of MTCD within the groups being paged. As an illustrative example, for a first MTCD class or type with limited capabilities, a paging condition may be a small number (e.g., binary) that is interpreted by the first MTCD to be a particular filter, such as "if reporting condition=3, then apply filter x". This technique is similar to dictionary based compression techniques wherein the filter dictionary is preconfigured in the first MTCD either during manufacturing, during installation, during attachment, dynamically using signaling (e.g., application layer signaling), and the like. As another illustrative example, for a second MTCD class or type with more capabilities, a paging condition may be expressed in some form of general purpose query language, semantically along the lines of a structured query language (SQL), such as "select temperature from temperature_sensor where (temperature>100) and (device.location=zone 4)".

The BS may receive reports from the MTCD(s) (block 470). The reports may be received as a result of the random access procedures using the PRACH partitions or as a result of contention-based transmissions occurring in the uplink contention-based channels identified in the paging records transmitted by the BS. The BS may, after receiving responses from the MTCD(s), allocate additional resources to allow the MTCD(s) to send the information to the BS. The BS may send the received reports (or information included in the received reports) to the MTC Application (block 475). The BS may provide processing to some of the report(s) prior to forwarding the report(s) in accordance with treatment(s) received.

According to an example embodiment, the BS may utilize a prioritized polling technique when it is transmitting the paging records. In other words, the transmission of the paging records may be scheduled to reflect a relative importance of the information that the BS is intending to request. The relative importance may, for example, have been communicated in the instructions provided to the BS by the MTC Application. As an illustrative example, the BS may transmit paging records for "highly critical" information at a first rate (e.g., once very T1 seconds), paging records for "important" information at a second rate (e.g., once every T2 seconds), and paging records for "normal" information at a third rate (e.g., once every T3 seconds), where T1<T2<T3.

Figure 5A:
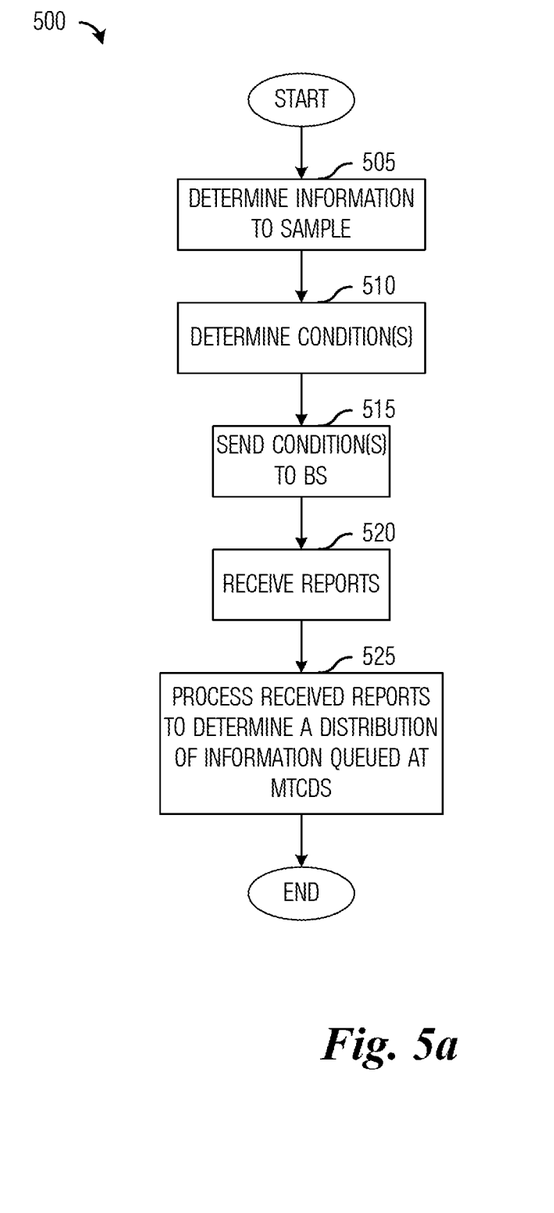
FIG. 5a illustrates a flow diagram of example operations occurring in a MTC Application utilizing sampling to determine an information distribution according to example embodiments described herein.

FIG. 5a illustrates a flow diagram of example operations 500 occurring in a MTC Application utilizing sampling to determine an information distribution. Operations 500 may be indicative of operations occurring in a MTC Application, such as MTC Application 250, as the MTC Application uses sampling to determine an information distribution. Operations 500 may be an example implementation of block 405 of FIG. 4a, sampling devices.

Operations 500 may begin with the MTC Application determining information to sample (block 505). The MTC Application may determine which type of information to sample, as well as sampling ranges. The MTC Application may determine condition(s) for paging records in accordance with the information to sample (block 510). As an illustrative example, the MTC Application may request a sampling of temperatures as recorded by temperature sensors with temperature ranges below 10 degrees, 11-20 degrees, 21-30 degrees, 31-40 degrees, 41-50 degrees, and over 51 degrees. As another illustrative example, the MTC Application may request a sampling of rainfall amounts as recorded by rain sensors with rain fall ranges 0 inches, 0.01 to 0.25 inches, 0.26 to 0.50 inches, 0.51 to 0.75 inches, 0.76 to 1.0 inches, and 1.01 and above. As yet another illustrative example, the MTC Application may request a sampling of door sensor state as recorded by door sensors with door sensor state equal to unlocked for front door, door sensor state equal to open for garage door, door sensor state equal to unlocked for back door, and door sensor state equal to unlocked for basement door.

The MTC Application may send the condition(s) to the BS (block 515). The MTC Application may also send treatment(s) to the BS. The MTC Application may receive reports from the BS (block 520). The reports from the BS may include the reports received by the BS or they may be a summary of the reports received by the BS. The MTC Application may process the received reports to determine a distribution of information queued at the MTCDs (block 525).

Figure 5B:
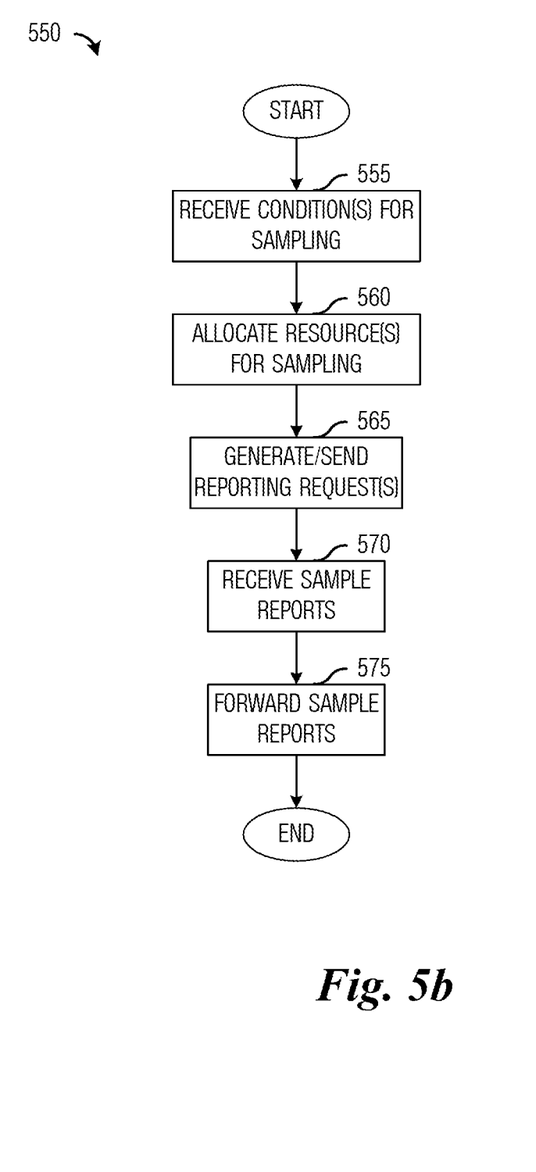
FIG. 5b illustrates a flow diagram of example operations occurring in a BS participating in sampling to determine an information distribution according to example embodiments described herein

FIG. 5b illustrates a flow diagram of example operations 550 occurring in a BS participating in sampling to determine an information distribution. Operations 550 may be indicative of operations occurring at a BS, such as BS 205, as the BS participates in sampling to determine an information distribution.

The BS may receive condition(s) for reporting request(s) (e.g., paging record(s)) as related to sampling from a MTC Application (block 555). The BS may determine uplink resources (e.g., Zadoff-Chu (ZC) sequences for an LTE PRACH partition) for reporting the information samples (block 560). As discussed previously, when sampling, the MTC Application is generally not interested in actually receiving the information being sampled. Instead, the MTC Application is using sampling to determine if there are MTCDs storing information meeting the condition(s) of the reporting request (e.g., paging record). Hence, the BS may not be concerned with collisions and may be interested in receiving responses only as an indication that the condition(s) associated with the reporting request (e.g., paging record) is being met. Therefore the BS may be able to allocate a small number of uplink resources per reporting request (e.g., paging record), for example a minimum number of PRACH ZC sequences required for a MTCD to perform the random access procedure. As an illustrative example, consider a situation wherein the MTC Application requests a sampling of temperatures recorded by temperature sensors. An example set of sampling ranges and PRACH resource is as follows:

100<temperature=PRACH resource 10 (e.g., ZC sequence 10);

90<temperature<100=PRACH resource 9 (e.g., ZC sequence 9);

80<temperature<90=PRACH resource 8 (e.g., ZC sequence 8);

70<temperature<80=PRACH resource 7 (e.g., ZC sequence 7);

and the like.

The BS may generate and send the reporting requests (e.g., paging records) in accordance with the condition(s) related to sampling and the PRACH resources and transmit the reporting requests (block 565). The BS may begin to receive transmissions on the assigned uplink resources (block 570). In other words, the BS may begin to receive transmissions of the ZC sequences with different ZC sequences corresponding to different reporting requests. In general, the presence or absence of a transmitted ZC sequence is noted by the BS. Random access collisions (when more than one MTCD transmits the same ZC sequence) may be ignored since the BS is typically not interested in the information being sent by the MTCDs. Additionally, since the BS is interested in the responses from the MTCDs and not the information itself, the BS may not make subsequent assignment of resources for the transmission of the information by the MTCDs that initiated the uplink transmission procedures, for example, PUSCH resources corresponding to random access procedures.

The BS may forward a report of the received transmissions (e.g., the ZC transmissions) to the MTC Application (block 575). Alternatively, the BS may process the received ZC transmissions to obtain a distribution of the information queued at the MTCDs which is then communicated by the BS to the MTC Application. As an illustrative example, if the BS received one or more transmissions on a PRACH resource assigned to a first paging record, the BS and MTC Application are able to determine that there is at least one MTCD with information meeting the condition(s) of the first paging record. As another illustrative example, if the BS does not receive any transmissions on a PRACH resource assigned to a second paging record, the BS and MTC Application are able to determine that there are no MTCDs with information meeting the condition(s) of the second paging record. Therefore, from the response(s) to the paging records, the MTC Application may be able to obtain distribution information about information stored by the MTCDs. Hence, from a single sampling process, the BS and hence, the MTC Application, can obtain a distribution of information from different MTCDs. The MTC Application may determine subsequent actions based on the distribution of information.

When using a contention-based channel (CBCH) for reporting, the BS may assign a different CBCH for each of the sampling ranges (block 560). If the BS successfully receives a transmission (e.g., a sample report) in a CBCH or if the BS detects a collision (e.g., resulting from two or more sample reports) in a CBCH assigned to a first reporting request (e.g. paging record) (block 570), the BS and MTC Application are able to determine that there is at least one MTCD with information meeting the condition(s) of the first reporting request. If the BS does not detect any transmissions or collisions on a CBCH assigned to a second reporting request, the BS and MTC Application are able to determine that there are no MTCDs with information meeting the condition(s) of the second reporting request.

Figure 6:
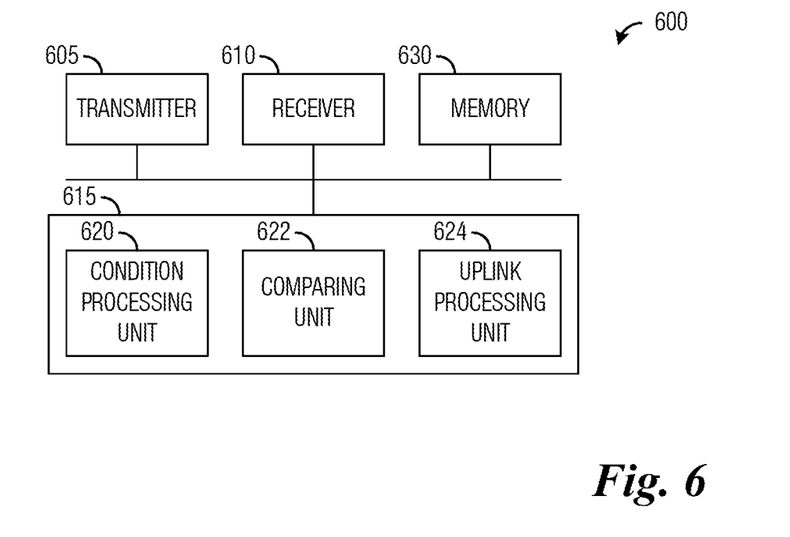
FIG. 6 illustrates an example MTCD according to example embodiments described herein.

FIG. 6 illustrates an example first communications device 600. Communications device 600 may be an implementation of a communications device, such as a machine-type communications device, or a wireless device, a mobile device, a mobile, a mobile station, a terminal, user, a subscriber, a station, a smartphone and the like, with MTCD functionality. Communications device 600 may be used to implement various ones of the embodiments discussed herein. As shown in FIG. 6, a transmitter 605 is configured to transmit frames, reports, and the like. Communications device 600 also includes a receiver 610 that is configured to receive frames, reporting requests (e.g. paging records), uplink transmission schedules, and the like.

A condition processing unit 620 is configured to determine if conditions of reporting requests (e.g. paging records and/or uplink transmission schedules) are met by information stored by communications device 600. Condition processing unit 620 is configured to process the conditions of the reporting requests (e.g., paging records and/or uplink transmission schedules), including reporting conditions, selection conditions, paging group condition, and the like, to determine if the information stored by communications device 600, as well as attributes of communications device 600, meet the conditions of the reporting requests. In general, condition processing unit 620 is configured to process the conditions and generate conditional operations from the conditions to allow for comparisons. A comparing unit 622 is configured to compare the information and/or attributes with the conditional operations to determine if the conditions of the reporting requests (e.g., paging records and/or uplink transmission schedules) are met. An uplink transmission processing unit 624 is configured to initiate and/or perform uplink procedures to allow communications device 600 to transmit. Uplink processing unit 624 is configured to utilize uplink resources as allocated in paging records and/or uplink transmission schedules. A memory 630 is configured to store reporting requests (e.g. paging records and/or uplink transmission schedules), conditions, information, attributes, group identifiers, uplink resource identifiers, and the like.

The elements of communications device 600 may be implemented as specific hardware logic blocks. In an alternative, the elements of communications device 600 may be implemented as software executing in a processor, controller, application specific integrated circuit, or so on. In yet another alternative, the elements of communications device 600 may be implemented as a combination of software and/or hardware.

As an example, receiver 610 and transmitter 605 may be implemented as a specific hardware block, while condition processing unit 620, comparing unit 622, and uplink processing unit 624 may be software modules executing in a microprocessor (such as processor 615) or a custom circuit or a custom compiled logic array of a field programmable logic array. Condition processing unit 620, comparing unit 622, and uplink processing unit 624 may be modules stored in memory 630.

Figure 7:
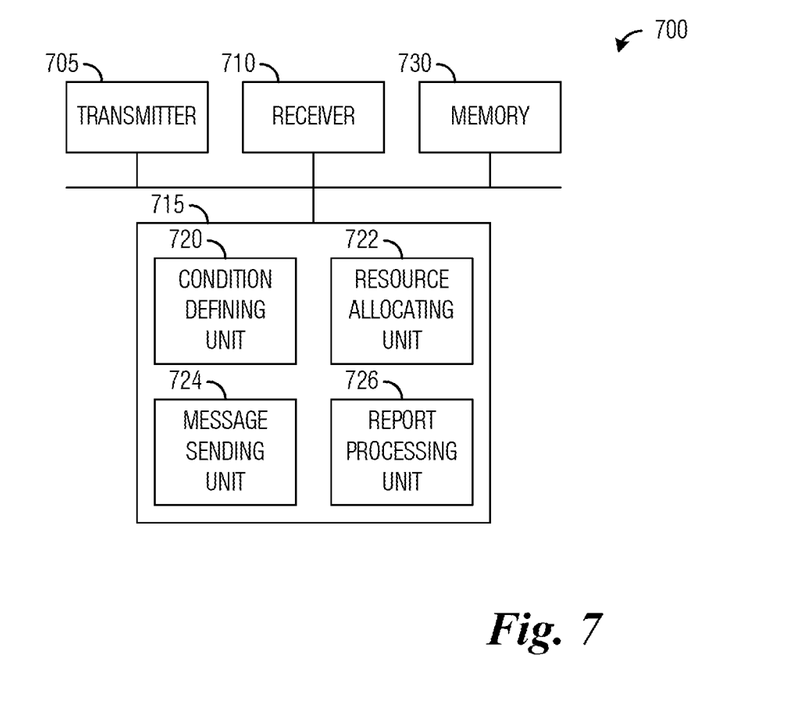
FIG. 7 illustrates an example Base Station according to example embodiments described herein.

FIG. 7 illustrates an example second communications device 700. Communications device 700 may be an implementation of a communications controller, such as an eNB, MTC Application server, interworking function, NodeB, access point, base station, controller, and the like. Communications device 700 may be used to implement various ones of the embodiments discussed herein. As shown in FIG. 7, a transmitter 705 is configured to transmit frames, reporting requests (e.g., paging records and/or uplink transmission schedules), and the like. Communications device 700 also includes a receiver 710 that is configured to receive frames, reports, and the like.

A condition defining unit 720 is configured to define conditions to perform content-based traffic control. Condition defining unit 720 is configured to define conditions such as reporting conditions, selection conditions, paging group condition, and the like, to control sending of reports from a MTCD to communications device 700 based on content of information and/or attributes of the MTCD. The conditions are used to generate reporting requests (e.g., paging records and/or uplink transmission schedules). A resource allocating unit 722 is configured to allocate uplink resources to allow MTCDs that meet the conditions of paging records and/or uplink transmission schedules to transmit or attempt to transmit reports to communications device 700. Different uplink resources may be assigned to different reporting requests. A message sending unit 724 is configured to send (or transmit) messages, such as paging records and/or uplink transmission schedules. A report processing unit 726 is configured to process reports received by communications device 700. Report processing unit 726 is configured to process reports received from MTCDs to obtain the information in the reports. Report processing unit 726 is configured to process transmissions received in uplink resources to sample a distribution of information stored at MTCDs. A memory 730 is configured to store reporting requests (e.g., paging records and/or uplink transmission schedules), conditions, information, attributes, group identifiers, uplink resource identifiers, reports, information distributions, and the like.

The elements of communications device 700 may be implemented as specific hardware logic blocks. In an alternative, the elements of communications device 700 may be implemented as software executing in a processor, controller, application specific integrated circuit, or so on. In yet another alternative, the elements of communications device 700 may be implemented as a combination of software and/or hardware.

As an example, receiver 710 and transmitter 705 may be implemented as a specific hardware block, while condition defining unit 720, resource allocating unit 722, message sending unit 724, and report processing unit 726 may be software modules executing in a microprocessor (such as processor 715) or a custom circuit or a custom compiled logic array of a field programmable logic array. Condition defining unit 720, resource allocating unit 722, message sending unit 724, and report processing unit 726 may be modules stored in memory 730.

Although the present disclosure and its advantages have been described in detail, it should be understood that various changes, substitutions and alterations can be made herein without departing from the spirit and scope of the disclosure as defined by the appended claims.

What is claimed is:

1. A method for operating a wireless device configured for wireless communications, the method comprising:
   detecting an event or condition associated with a machine type communications (MTC) service provided by the wireless device;
   receiving, by the wireless device, uplink resource allocation information and a reporting request including a reporting criteria that the detected event or condition is required to satisfy in order for the wireless device to report the detected event or condition; and
   initiating, by the wireless device, an uplink transmission to report the detected event or condition using the uplink resource allocation information in response to the reporting criteria being satisfied by the detected event or condition associated with the MTC service.

2. The method of claim 1, wherein the uplink resource allocation information further includes a physical random access channel (PRACH) partition identifier, and wherein the uplink transmission comprises a random access procedure initiated in a PRACH partition identified by the PRACH partition identifier.

3. The method of claim 2, wherein initiating a random access procedure comprises transmitting in the PRACH partition identified by the PRACH partition identifier.

4. The method of claim 2, further comprising:
   receiving a resource allocation indicating an uplink transmission resource in accordance with the random access procedure; and
   reporting the detected event or condition that satisfies the reporting criteria over the uplink transmission resource indicated by the resource allocation.

5. The method of claim 1, wherein the uplink resource allocation information further includes a contention-based channel (CBCH) identifier, and wherein a contention-based transmission procedure is initiated in a CBCH identified by the CBCH identifier.

6. The method of claim 5, wherein the contention-based transmission procedure comprises reporting the detected event or condition that satisfies the reporting criteria in the CBCH.

7. The method of claim 1, wherein the reporting request further includes a selecting condition that an attribute associated with the wireless device is required to satisfy in order for the wireless device to report the detected event or condition, and wherein the uplink transmission is initiated in response to the reporting criteria and the selecting condition being satisfied.

8. The method of claim 1, wherein the reporting request further includes a group condition that a group identifier associated with the wireless device is required to satisfy in order for the wireless device to report the detected event or condition, and wherein the uplink transmission is initiated in response to the reporting criteria and the group condition being satisfied.

9. The method of claim 1, wherein the reporting request comprises a paging record.

10. The method of claim 9, wherein the paging record is received in a physical downlink shared channel (PDSCH).

11. The method of claim 10, wherein the paging record is indicated by downlink control information (DCI) configured with a content-based paging radio network temporary identifier (MC-RNTI) located in a physical downlink control channel (PDCCH).

12. The method of claim 1, wherein the reporting request further includes a report time condition, and wherein initiating the uplink transmission occurs in response to the report time condition being met.

13. The method of claim 12, wherein the reporting request comprises an uplink transmission schedule.

14. The method of claim 12, wherein the report time condition comprises at least one of a time interval between reports, a timer value, or specific report times.

15. The method of claim 1, wherein the uplink resource allocation information comprises uplink resource allocation based on at least one of an expected number of wireless devices sending reports, priority of events or conditions, or historical information in determination of a number of uplink resources, or uplink resource demand from wireless devices.

16. A method for operating a base station, the method comprising:
   generating, by the base station, uplink resource allocation information and a reporting request including a first reporting criteria that is required to be satisfied in order for a device to report a detected event or condition associated with a machine type communications (MTC) service provided by the device;
   transmitting, by the base station, the reporting request and the uplink resource allocation information to the device; and
   receiving, by the base station, an uplink transmission reporting a detected event or condition associated with the MTC service that satisfies the reporting criteria.

17. The method of claim 16, wherein the reporting request is generated in accordance with a prioritization of the detected event or condition.

18. The method of claim 16, wherein receiving the information about the detected event or condition comprises:
   receiving a transmission in a random access channel from the device;
   allocating a transmission resource for the device in accordance with the transmission in the random access channel;
   transmitting allocation information about the allocated transmission resource to the device; and
   receiving the information about the detected event or condition over the allocated transmission resource.

19. The method of claim 18, wherein the uplink resource allocation information further includes a physical random access channel (PRACH) partition identifier specifying a PRACH partition containing PRACH resources used to initiate a transmission of the information about the detected event or condition by the device.

20. The method of claim 19, wherein a number of PRACH resources in the PRACH partition is determined in accordance with the reporting request.

21. The method of claim 16, wherein receiving the information about the detected event or condition comprises:
   receiving the information about the detected event or condition in a contention-based channel (CBCH) from the device.

22. The method of claim 21, wherein the uplink resource allocation information further includes a CBCH identifier specifying CBCH resources to be used for transmission of the information about the detected event or condition by the device.

23. The method of claim 22, wherein a number of uplink resources assigned to the CBCH is determined in accordance with the reporting request.

24. The method of claim 16, wherein the reporting request further comprises a selecting condition that is configured to prompt the device to report the detected event or condition in response to the detected event or condition satisfying the first reporting criteria and an attribute associated with the device satisfying the selecting condition.

25. The method of claim 16, wherein the reporting request further comprises a group condition that is configured to prompt the device to report the detected event or condition in response to the detected event or condition satisfying the first reporting criteria and a group identifier associated with the device satisfying the group condition.

26. The method of claim 16, further comprising sampling devices served by the base station to obtain a distribution of detected events or conditions held by the devices, wherein the reporting request is generated in accordance with the distribution of the detected events or conditions.

27. The method of claim 26, wherein sampling the devices comprises:
   generating sampling reporting requests including second reporting criteria, the sampling reporting requests are configured to prompt the device to report the detected event or condition stored at the device in response to the detected event or condition satisfying at least one of the second reporting criteria;
   transmitting the sampling reporting requests; and
   receiving a response in an uplink channel in accordance with the sampling reporting requests.

28. The method of claim 16, wherein the reporting request further includes a report time condition configured to prompt the device to report the detected event or condition in response to the report time condition being met.

29. The method of claim 16, wherein the reporting request comprises a paging record.

30. The method of claim 16, wherein the reporting request comprises an uplink transmission schedule.

31. The method of claim 16, wherein the uplink resource allocation information comprises uplink resource allocation based on at least one of an expected number of wireless devices sending reports, priority of events or conditions, or historical information in determination of a number of uplink resources, or uplink resource demand from wireless devices.

32. A wireless device comprising:
   a receiver configured to receive uplink resource allocation information and a reporting request from a base station, the reporting request includes a reporting criteria that a detected event or condition associated with a machine type communications (MTC) service provided by the wireless device is required to satisfy in order for the wireless device to report the detected event or condition; and
   a processor operatively coupled to the receiver, the processor configured to initiate an uplink transmission reporting a detected event or condition associated with the MTC service in response to the the reporting criteria being satisfied by the detected event or condition.

33. The wireless device of claim 32, wherein the uplink resource allocation information further includes a physical random access channel (PRACH) partition identifier, and wherein the processor is configured to initiate a random access procedure in a PRACH partition identified by the PRACH partition identifier.

34. The wireless device of claim 33, wherein the receiver is configured to receive a resource allocation indicating a transmission resource in accordance with the random access procedure, and wherein the wireless device further comprises a transmitter operatively coupled to the processor, the transmitter configured to transmit the information about the detected event or condition over the transmission resource indicated by the resource allocation.

35. The wireless device of claim 32, wherein the uplink resource allocation information further includes a contention-based channel (CBCH) identifier, and wherein the processor is configured to initiate a contention-based transmission procedure in a CBCH identified by the CBCH identifier.

36. The wireless device of claim 35, wherein the receiver is configured to receive a resource allocation indicating a transmission resource in accordance with the contention-based transmission procedure, and wherein the wireless device further comprises a transmitter operatively coupled to the processor, the transmitter configured to transmit the information about the detected event or condition over the transmission resource indicated by the resource allocation.

37. The wireless device of claim 32, wherein the reporting request further includes a selecting condition that an attribute associated with the wireless device is required to satisfy in order for the wireless device to report the detected event or condition, and wherein the processor is configured to initiate the uplink transmission in response to the reporting criteria and the selecting condition being satisfied.

38. The wireless device of claim 32, wherein the reporting request further includes a group condition that a group identifier associated with the wireless device is required to satisfy in order for the wireless device to report the detected event or condition, and wherein the processor is configured to initiate the uplink transmission in response to the reporting criteria and the group condition being satisfied.

39. The wireless device of claim 32, wherein the reporting request further includes a report time condition, and wherein the processor is configured to initiate the uplink transmission in response to the report time condition being met.

40. The wireless device of claim 32, wherein the reporting request comprises a paging record.

41. The wireless device of claim 32, wherein the reporting request comprises an uplink transmission schedule.

42. The wireless device of claim 32, wherein the uplink resource allocation information comprises uplink resource allocation based on at least one of an expected number of wireless devices sending reports, priority of events or conditions, or historical information in determination of a number of uplink resources, or uplink resource demand from wireless devices.

43. A base station comprising:
a processor configured to generate uplink resource allocation information and a reporting request including a first reporting criteria that a detected event or condition associated with a machine type communications (MTC) service provided by a device is required to satisfy in order for the device to report the detected event or condition to the base station;
a transmitter operatively coupled to the processor, the transmitter configured to transmit the reporting request and the uplink resource allocation information to the device; and
a receiver operatively coupled to the processor, the receiver configured to receive an uplink transmission reporting a detected event or condition associated with the MTC service that satisfies the reporting criteria.

44. The base station of claim 43, wherein the receiver is configured to receive a transmission in a random access channel from the device, and to receive the information about the detected event or condition over an allocated transmission resource, wherein the processor is configured to allocate a transmission resource for the device in accordance with the transmission in the random access channel, and wherein the transmitter is configured to transmit allocation information about the allocated transmission resource to the device.

45. The base station of claim 43, wherein the receiver is configured to receive a transmission in a contention-based channel from the device, and to receive the information about the detected event or condition over an allocated transmission resource, wherein the processor is configured to allocate a transmission resource for the device in accordance with the transmission in the contention-based channel, and wherein the transmitter is configured to transmit allocation information about the allocated transmission resource to the device.

46. The base station of claim 43, wherein the processor is configured to sample devices served by the base station to obtain a distribution of detected events or conditions held by the devices, and to generate the reporting request in accordance with the distribution of the detected events or conditions.

47. The base station of claim 46, wherein the processor is configured to generate sampling reporting requests including second reporting criteria, the sampling reporting requests are configured to prompt the device to transmit the information about the detected event or condition stored at the device in response to the detected event or condition satisfying at least one of the second reporting criteria, wherein the transmitter is configured to transmit the sampling reporting requests, and wherein the receiver is configured to receiving a response in a second uplink transmission channel in accordance with the sampling reporting requests.

48. The base station of claim 46, wherein the reporting request further includes a report time condition configured to prompt the device to transmit the information about the detected event or condition in response to the report time condition being met.

49. The base station of claim 46, wherein the reporting request comprises a paging record.

50. The base station of claim 46, wherein the reporting request comprises an uplink transmission schedule.

51. The base station of claim 43, wherein the uplink resource allocation information comprises uplink resource allocation based on at least one of an expected number of wireless devices sending reports, priority of events or conditions, or historical information in determination of a number of uplink resources, or uplink resource demand from wireless devices.

* * * * *